US006607219B2

United States Patent
Mirales et al.

(10) Patent No.: US 6,607,219 B2
(45) Date of Patent: Aug. 19, 2003

(54) EXPANSION TYPE CLAMPING BAND CHARACTERIZED BY SIMPLIFIED DESIGN AND EASE OF USE

(75) Inventors: James Mirales, Jamison, PA (US); James A. Westhoff, Langhorne, PA (US); James A. Kelly, Upper Black Eddy, PA (US)

(73) Assignee: Poly-Tec Products, Inc., Tullytown, PA (US)

( * ) Notice: Subject to any disclaimer, the term of this patent is extended or adjusted under 35 U.S.C. 154(b) by 37 days.

(21) Appl. No.: 09/880,413

(22) Filed: Jun. 13, 2001

(65) Prior Publication Data

US 2002/0190478 A1 Dec. 19, 2002

(51) Int. Cl.[7] .............................................. F16L 21/00
(52) U.S. Cl. ....................... 285/236; 285/230; 277/576; 24/268
(58) Field of Search ................................ 285/237, 236, 285/421, 230; 277/576; 24/268, 274 R, 19, 25

(56) References Cited

U.S. PATENT DOCUMENTS

| | | | | | |
|---|---|---|---|---|---|
| 2,627,635 | A | * | 2/1953 | Seltzer ......................... | 24/268 |
| 2,650,115 | A | * | 8/1953 | Taylor ......................... | 285/421 |
| 2,692,417 | A | * | 10/1954 | Primich ....................... | 285/421 |
| 2,778,085 | A | * | 1/1957 | Bernard ....................... | 24/268 |
| 2,803,866 | A | * | 8/1957 | Flora .......................... | 24/268 |
| 2,922,212 | A | * | 1/1960 | Textrum ....................... | 24/268 |
| 4,387,900 | A | * | 6/1983 | Ditcher et al. ............... | 285/230 |
| 4,702,645 | A | * | 10/1987 | Skinner et al. ............... | 285/230 |
| 5,029,907 | A | * | 7/1991 | Gundy ......................... | 285/230 |
| 5,150,927 | A | * | 9/1992 | Skinner ........................ | 285/236 |
| 5,431,459 | A | * | 7/1995 | Gundy ......................... | 285/237 |
| 5,496,128 | A | * | 3/1996 | Odill .......................... | 277/616 |
| 6,152,455 | A | * | 11/2000 | Brockway et al. ............ | 277/576 |

OTHER PUBLICATIONS

Press–Seal Gasket Corp., Installation Page, 1987, 1 page.
NPC Inc. Kor–N–Seal I—Wedge Korband Installation Procedure, 6 pages Admitted Prior Art.
EPCO Enviroengineering Products Co., Inc., Manhole Products Group, 2 pages.

* cited by examiner

Primary Examiner—Lynne H. Browne
Assistant Examiner—David E. Bochna
(74) Attorney, Agent, or Firm—Volpe and Koenig, P.C.

(57) ABSTRACT

An annular-shaped, expansion type clamping band has laterally overlapping ends, each having a skewed surface, the skewed surfaces slidably engaging one another. The ends are further provided with elongated guide slots for receiving a threaded bolt. A threaded nut threadly engaging the bolt, when tightened, moves the overlapping ends toward a longitudinal central axis of the band whereby the band expands to exert an outward radial force against an interior surface of a gasket to provide a liquid-tight fit between the gasket and an opening having a surface engaging an outer periphery of the gasket. The band may be a one-piece or two-or-three-piece assembly and may be formed of an suitable metallic or plastic material. The threaded member is slidable along the aforesaid guide slots enabling the bolts to be self-centered. The nut and bolt assembly, in one embodiment is designed to require only one tightening tool.

42 Claims, 10 Drawing Sheets

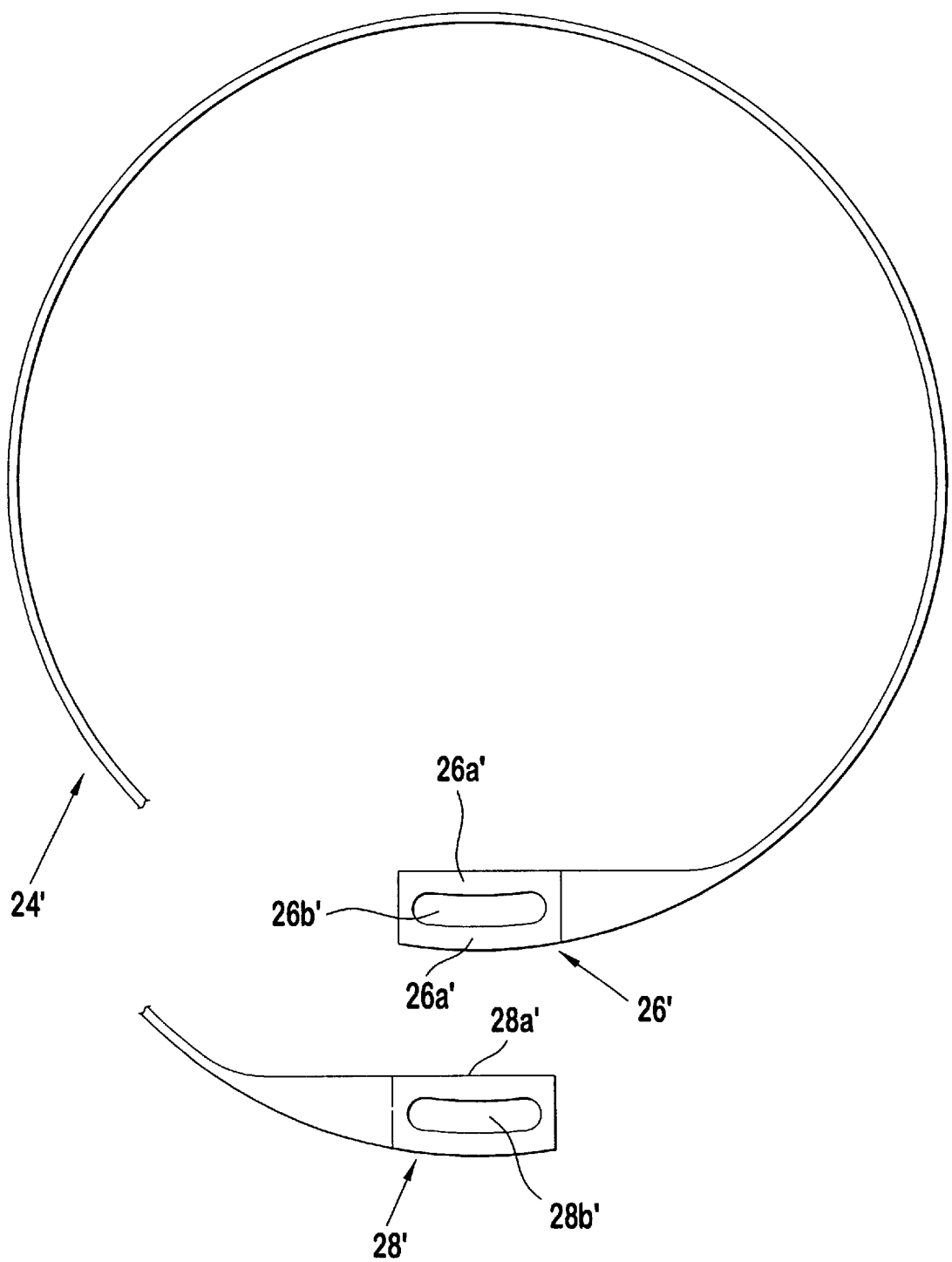

FIG. 4a
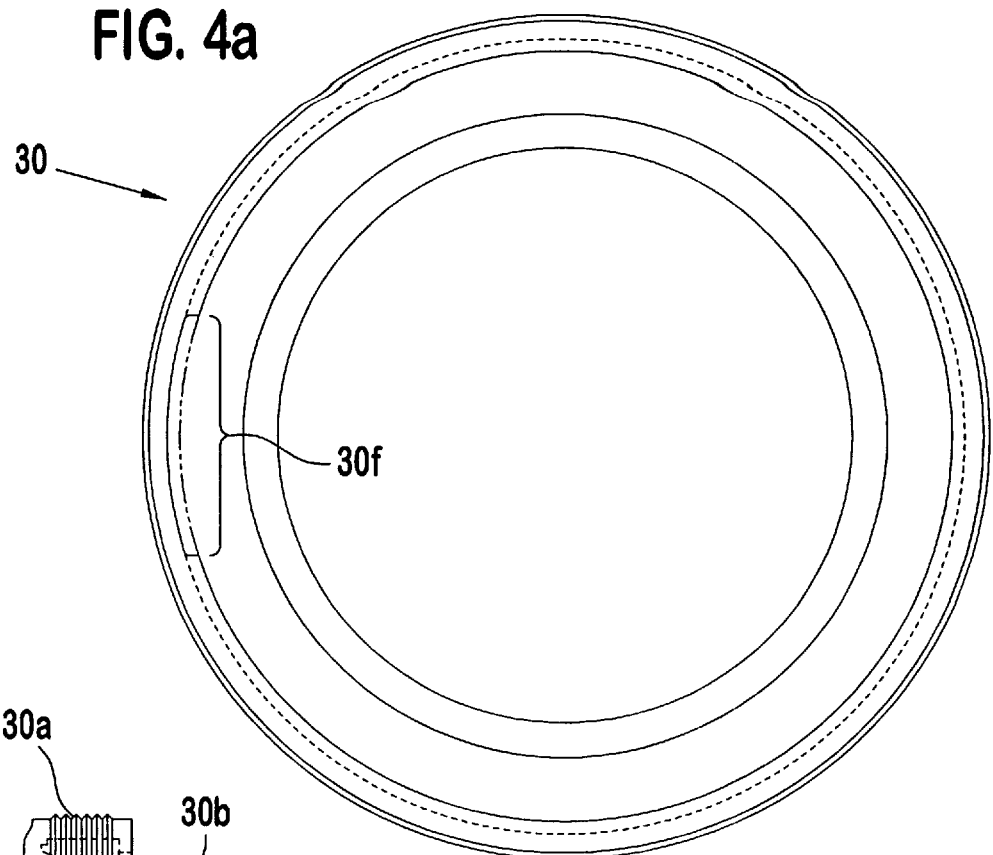
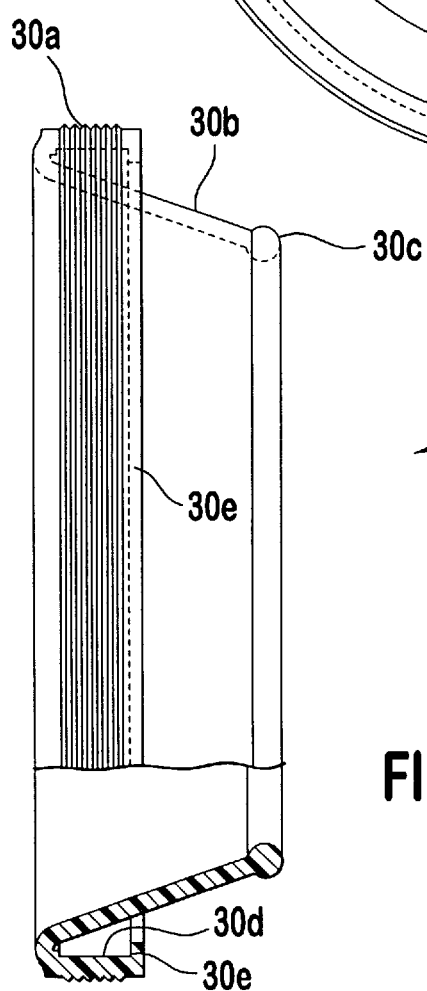
FIG. 4b

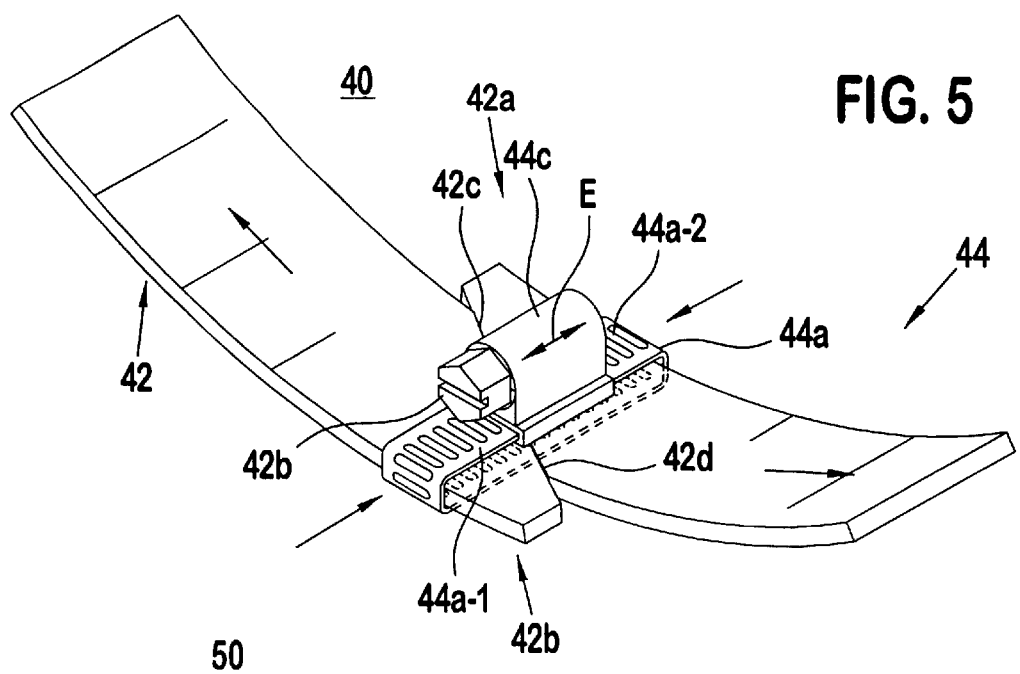
FIG. 5
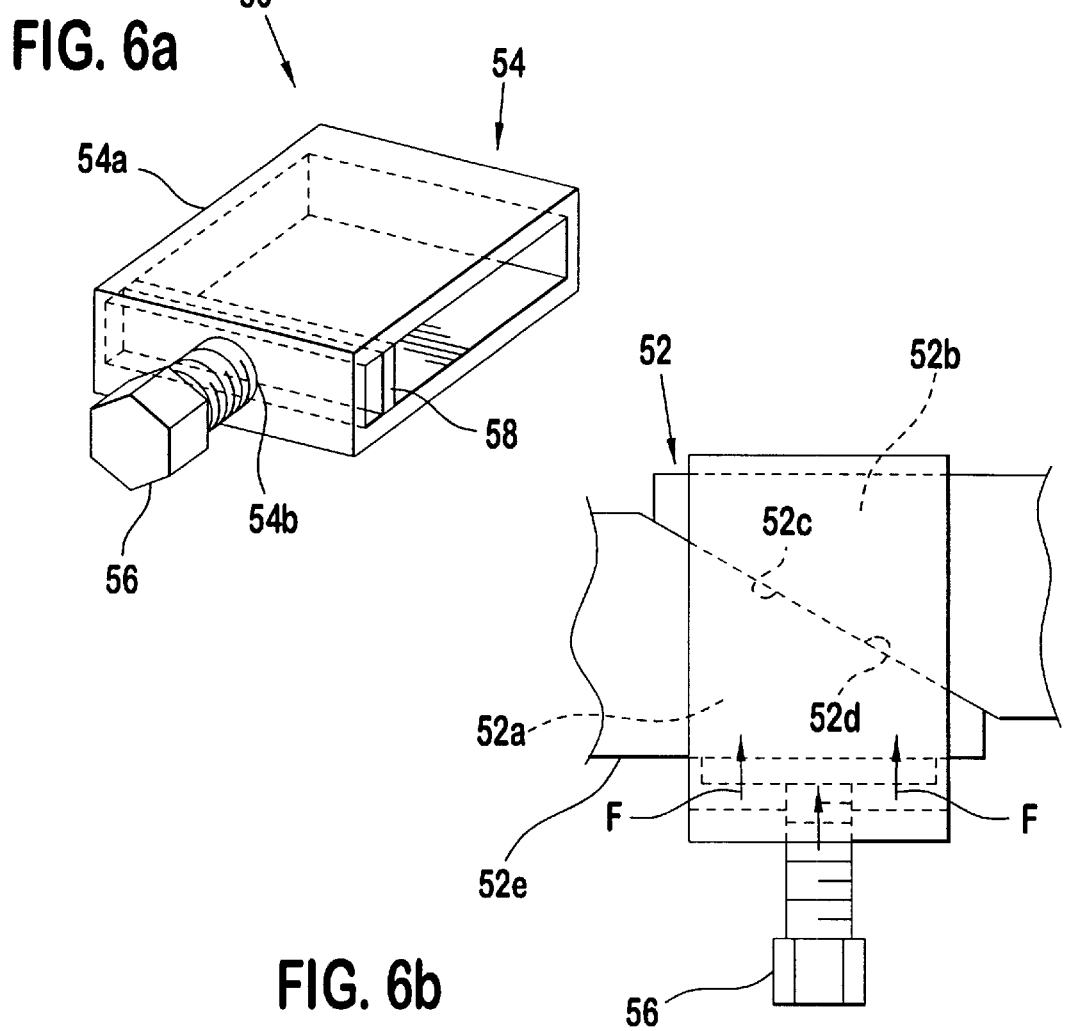
FIG. 6a
FIG. 6b

EXPANSION TYPE CLAMPING BAND CHARACTERIZED BY SIMPLIFIED DESIGN AND EASE OF USE

BACKGROUND

The present invention relates to expansion type clamping bands and more particularly to a novel expansion type clamping band characterized by simplicity of design and ease of use of and incorporating diagonally aligned sliding surfaces which cooperate with compression means to both align and expand the clamping band.

Expansion type clamping bands are typically utilized to urge a gasket against an opening in a cast member, such as, for example, a manhole base, to provide a liquid-tight seal between the gasket and the opening in the cast member.

Conventional expansion type clamp assemblies require the use of tools to be assured that the clamping assembly is expanded sufficiently to provide an adequate liquid-tight seal. Since the installation requires operators to work within an internal confined space, these installations become tedious and difficult.

It is therefore one object of the present invention to provide a novel expansion type clamping band assembly which is distinguished by its simplicity of design and ease of use and installation.

Still another object of the present invention is to provide an expansion type clamping band which is distinguished by its reduced number of elements.

Still another object of the present invention is to provide a novel expansion type clamping band which yields an accurate and positive indication that the desired amount of expansion has been obtained by way of a torque reading obtained from a torque wrench or the like.

Still another object of the present invention is to provide a novel expansion type clamping band, which, in one preferred embodiment, avoids the need for simultaneous use of two tightening tools.

Still another object of the present invention is to provide a novel expansion type clamping band and provides for expansion through the movement of first and second initially laterally offset ends of the clamping band through simple compression means and to provide a novel expansion type clamping band which provides for expansion through the movement of first and second offset ends of the clamping band through simplified compression means which slidably engage ends of the compression band and are free to move therealong during the expansion process to provide automatic centering of the compression means.

The above as well as other objects of the present invention will become apparent when reading the accompanying description and drawings in which.

Figures 1, 1A:
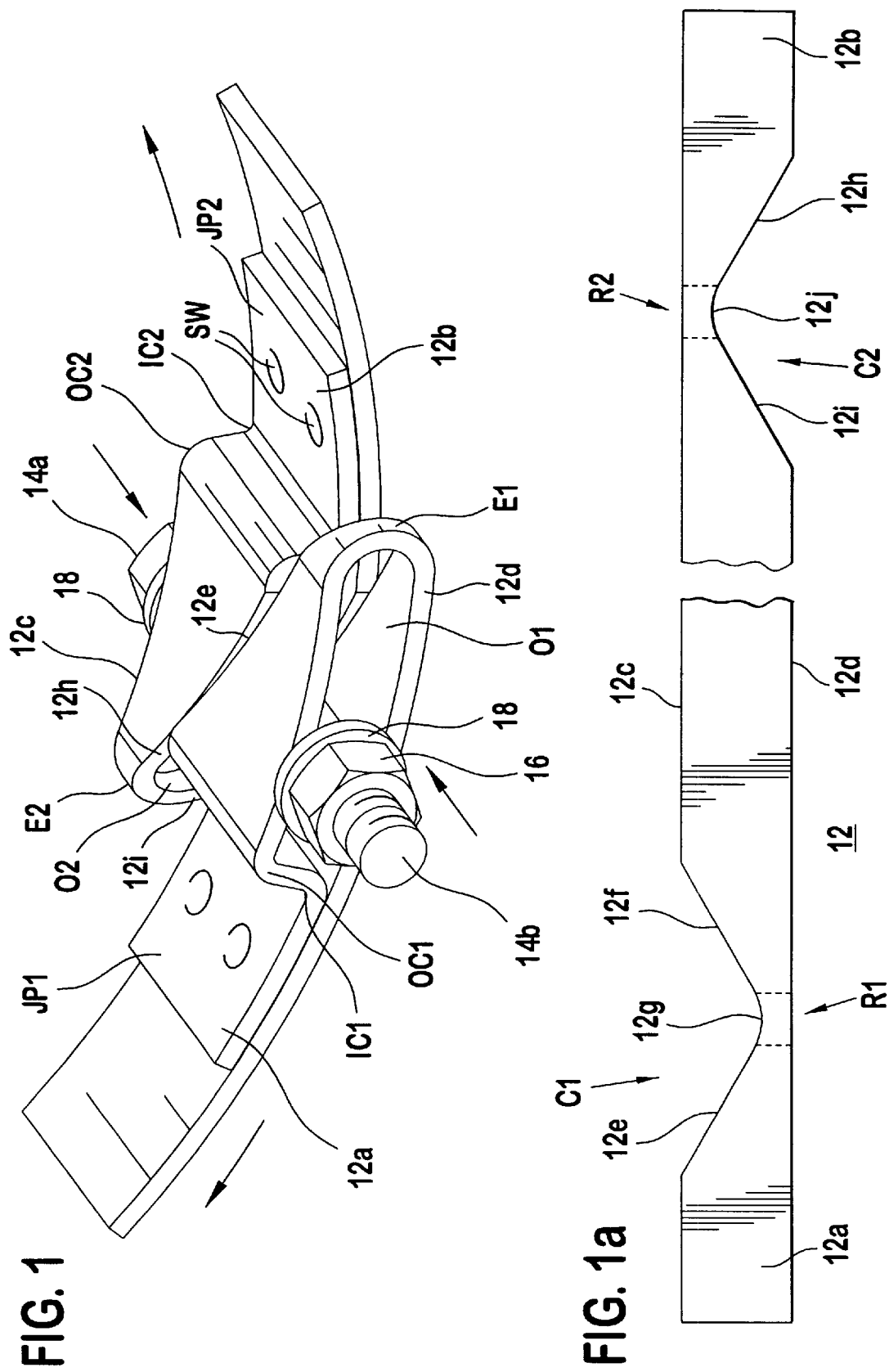
FIG. 1 is a perspective view showing a portion of a expansion type clamping band embodying the principles of the present invention.
FIG. 1a shows a plan view of the band type shown in FIG. 1 prior to being bent into the desired shape.
Figure 1B:
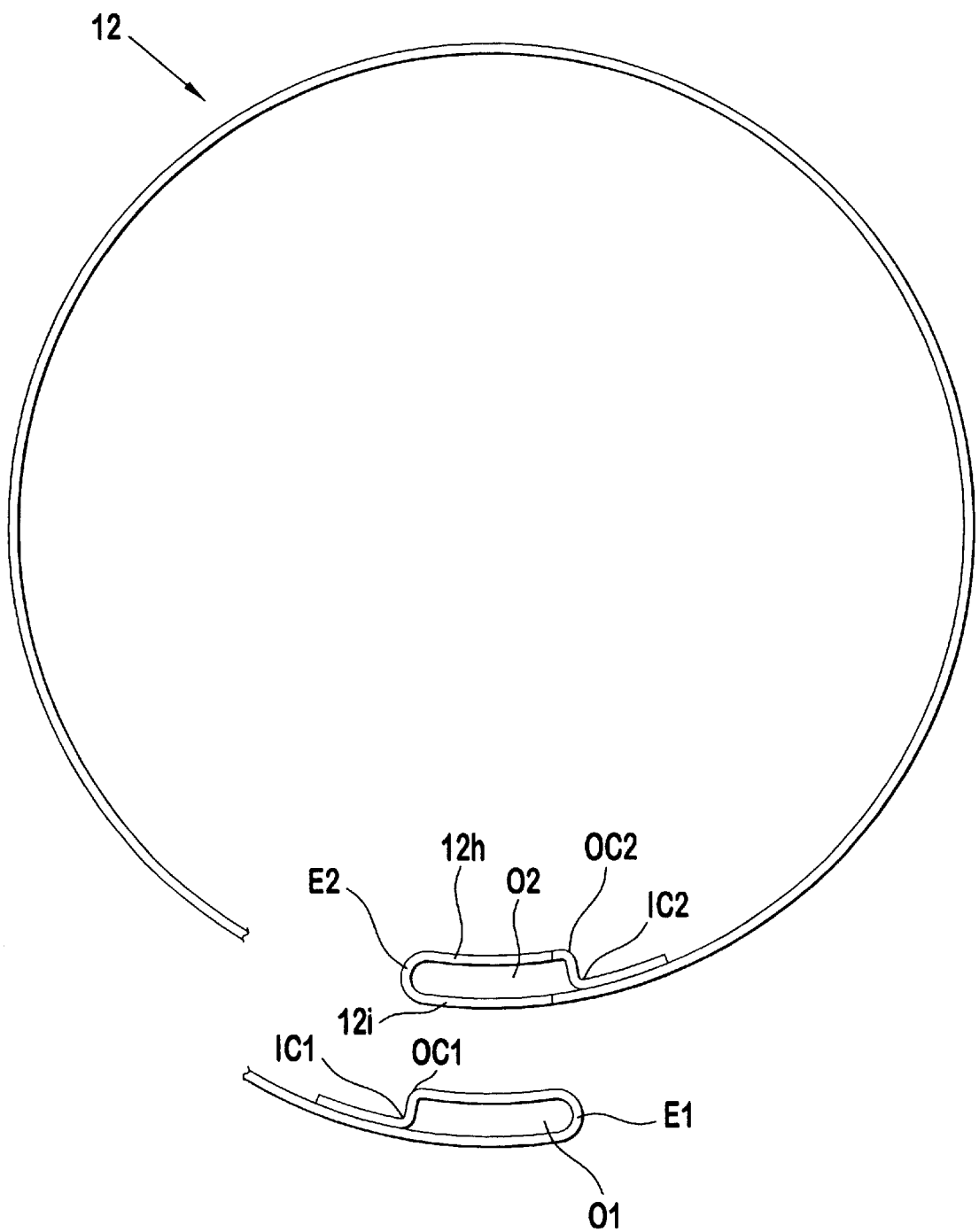
FIG. 1b shows a plan view of clamping band of the type shown in FIG. 1.
Figure 1C:
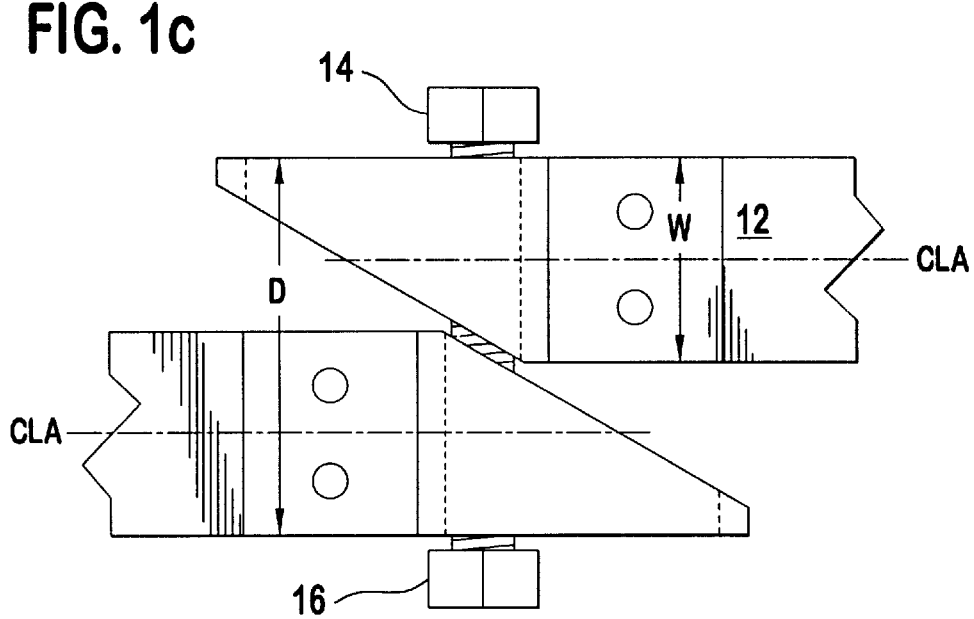
FIG. 1c shows a plan view of the ends of the clamping band prior to tightening of the compression means.
Figure 1D:
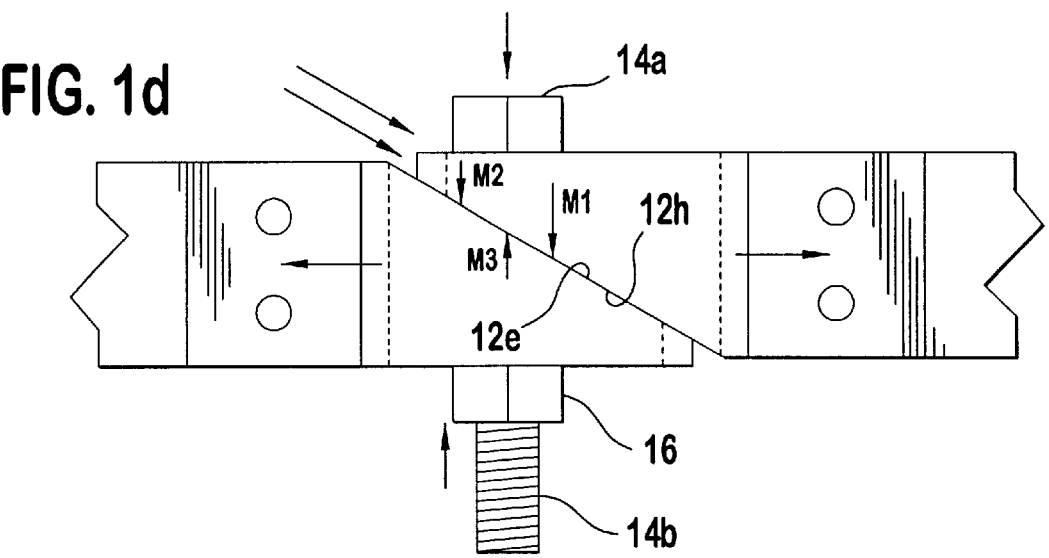
FIG. 1d shows a plan view of the ends of the clamping band when the compression means is tightened.
Figure 1E:
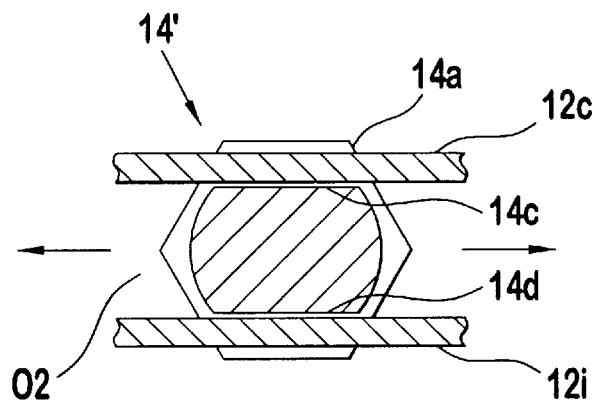
FIG. 1e shows sectional view of a portion of a clamping band slightly modified from the embodiment shown in FIG. 1.
Figure 1F:
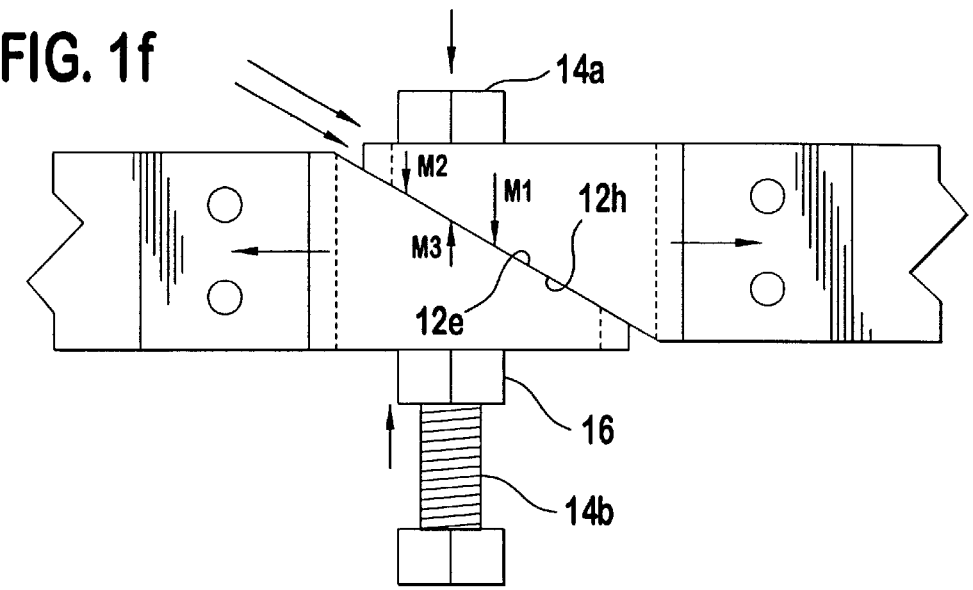
FIGS. 1f, 1g and 1h shows still further alternative embodiments for the clamping band assembly of FIG. 1.
Figure 1G:
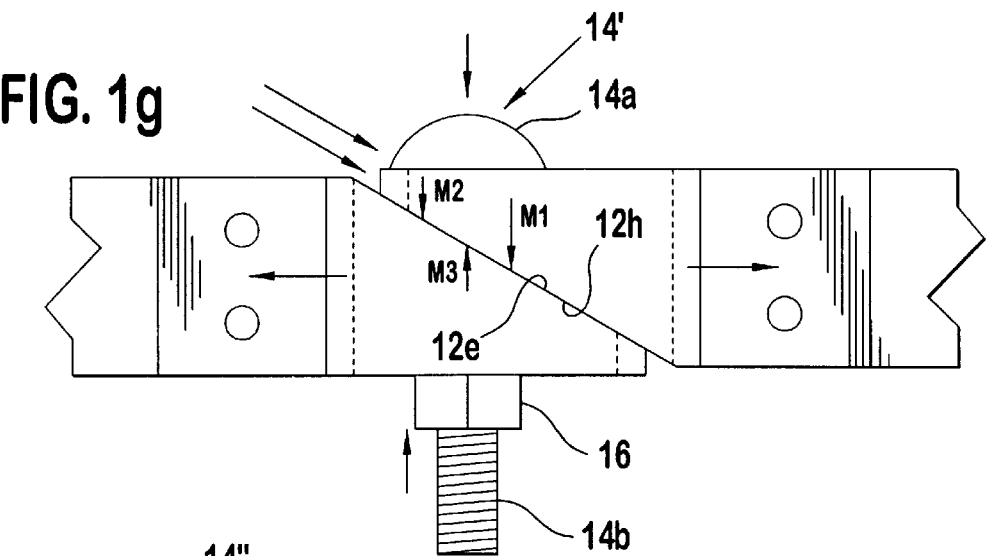
Figure 1H:
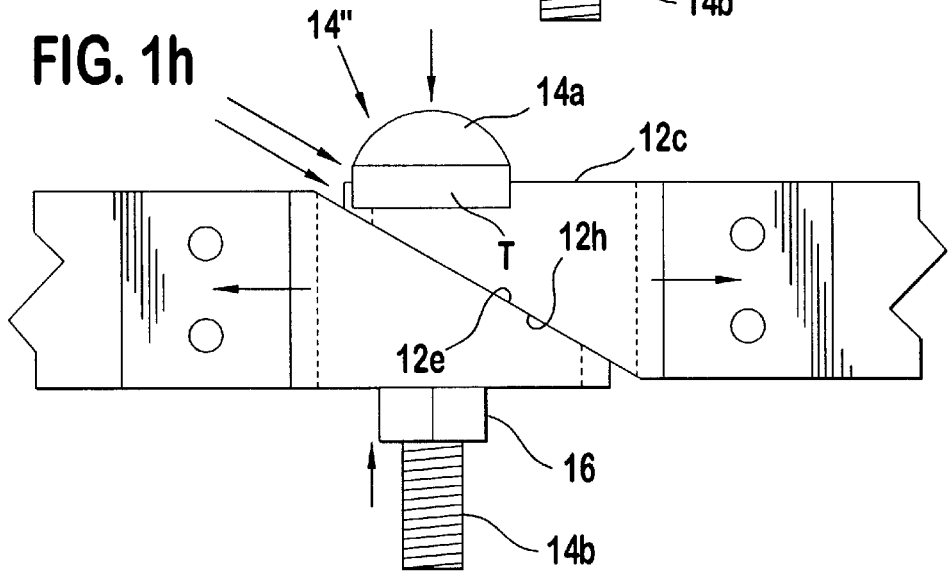
Figure 1I:
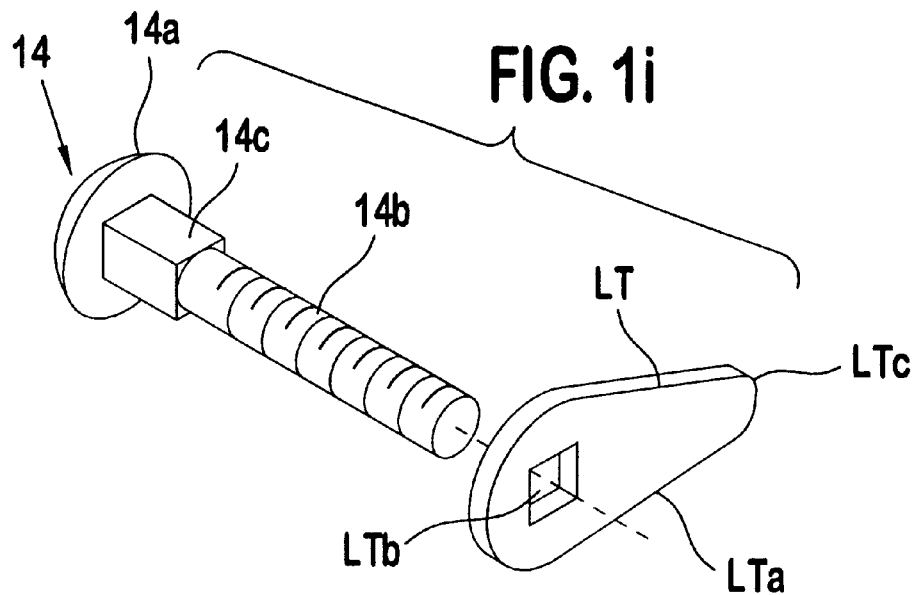
FIG. 1i is a perspective view of a locking tab for use with the expansion-type clamping assembly of the type shown in FIG. 1.
Figure 1J:
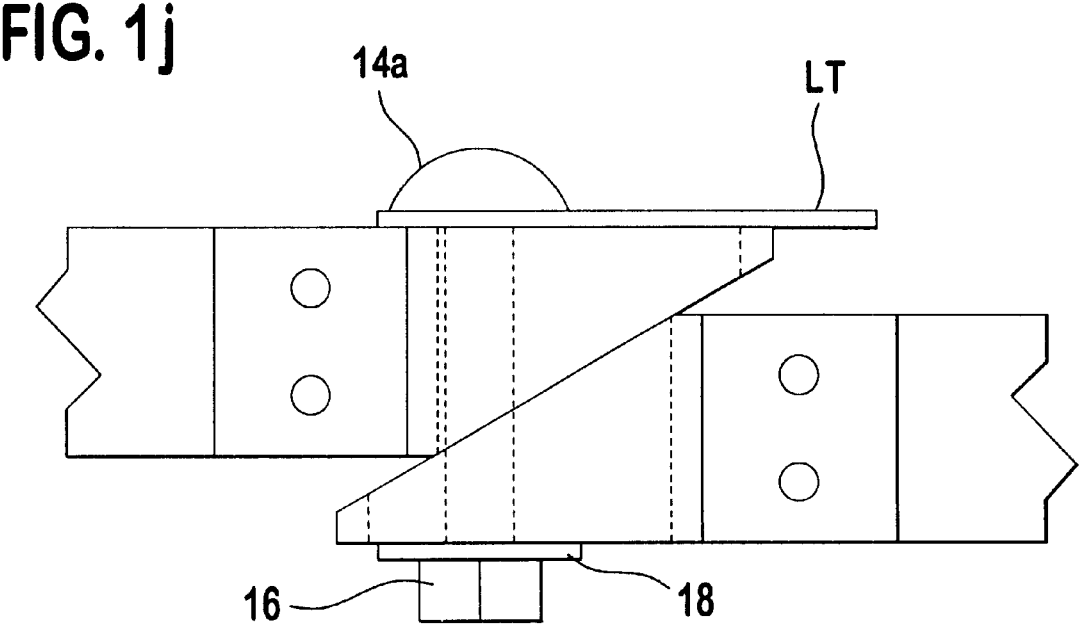
Figure 1K:
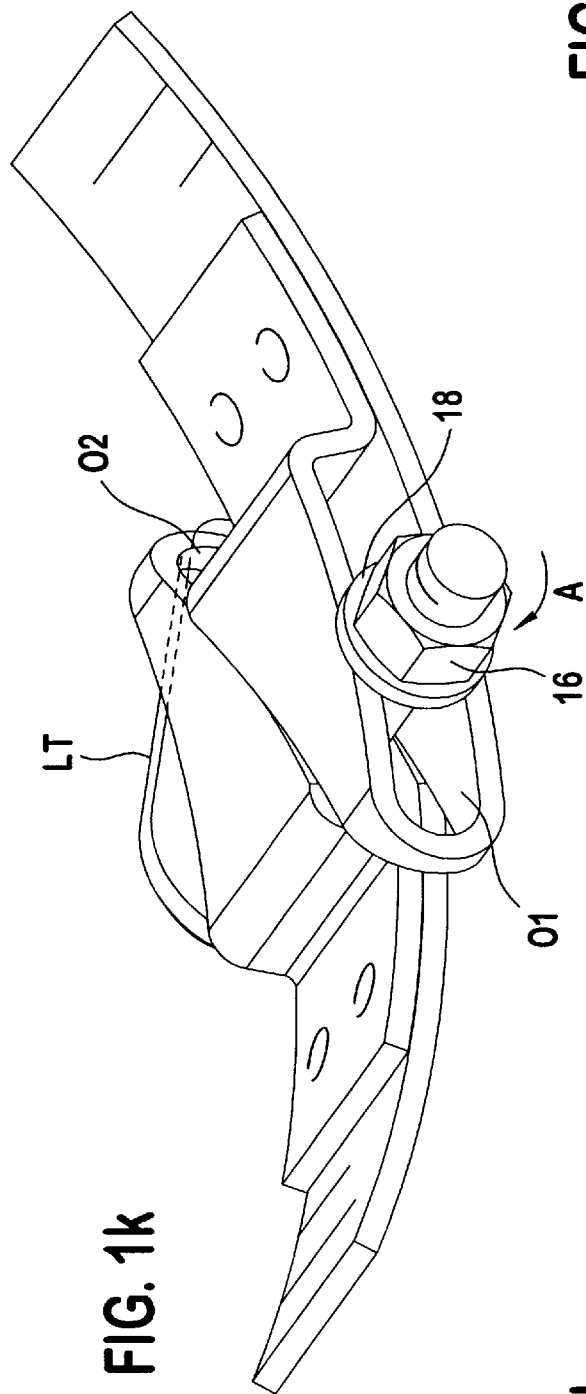

FIGS. 1j and 1k respectively show a plan view and perspective view of the locking tab of FIG. 1i incorporated in an expansion type clamping assembly.

Figure 1M:
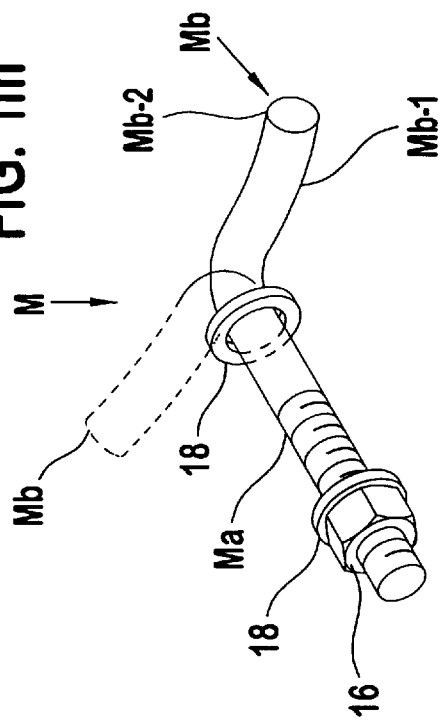
Figure 1L:
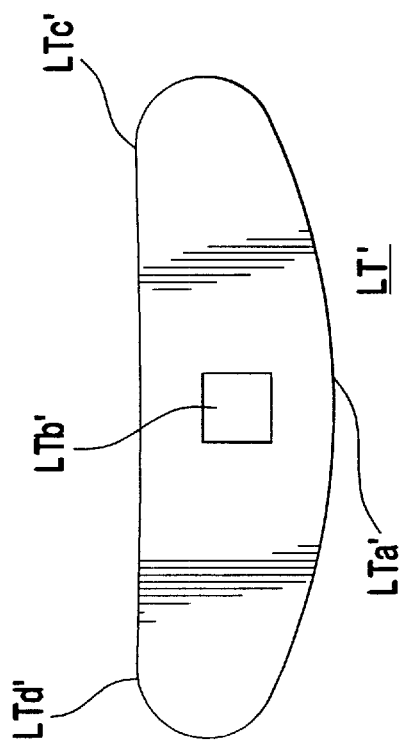

FIG. 1l is a plan view of a modified locking tab.

FIG. 1m is a perspective view of modified threaded member for use as an alternative to the locking tab of FIGS. 1i–1k.

Figure 2:
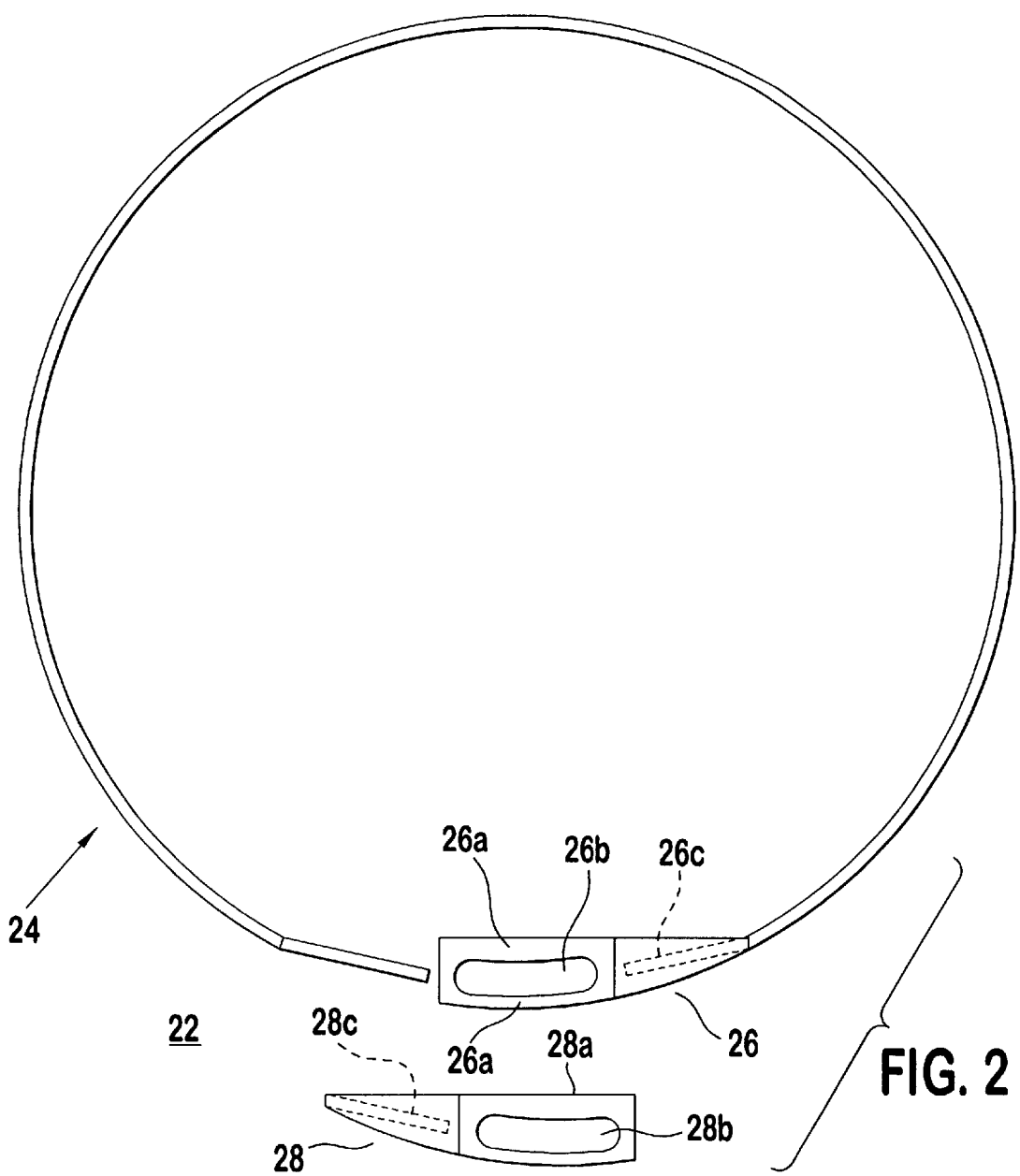

FIG. 2 is a plan view showing another alternative clamping band of the present invention.

Figure 2A:
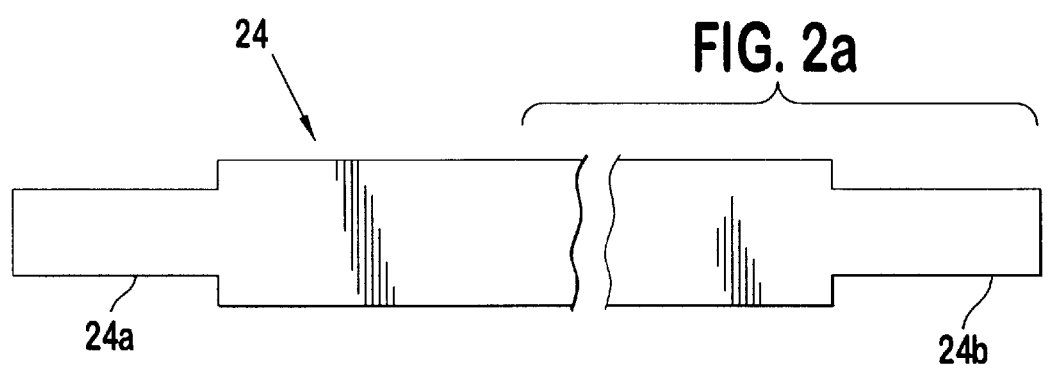

FIG. 2a shows a plan view of the band portion employed in the embodiment of FIG. 2.

FIG. 3 shows an alternative embodiment of the clamping band shown in FIG. 2.

FIGS. 4a and 4b respectively show a side and an end view, partially sectionalized of a gasket for use with the clamping bands of the present invention.

FIG. 5 is a perspective view of another embodiment of the present invention.

FIGS. 6a and 6b are respectively perspective and plan views of another embodiment of the present invention.

DETAILED DESCRIPTION OF THE INVENTION AND PREFERRED EMBODIMENTS THEREOF

FIG. 1 is a perspective view showing a first preferred embodiment 10 of a clamping band assembly incorporating the principles of the present invention. The assembly 10 is comprised of an elongated band 12 formed from a single stainless sheet of steel stock of a suitable thickness such as, for example, 0.105 inches. As shown in FIG. 1a, the band 12 is initially formed from a flat sheet of metallic material preferably stainless steel; and is provided with first and second substantially V-shaped cut-outs C1 and C2 arranged on opposite longitudinal sides 12c and 12d of the band 12.

The V-shaped cut-out C1 is defined by tapering surfaces 12e, 12f, adjacent ends there of being joined by a curved intermediate portion 12g. Similarly, V-shaped cut-out C2 is defined by surfaces 12h, 12i with their adjacent ends being joined by curved, intermediate portion 12j. If desired, two curved portions 12g and 12j may be right-angle or squared-off corners.

Curved bends are formed in the regions R1 and R2 of the curved surfaces 12g and 12j which become the rounded ends E1 and E2 shown if FIG. 1. The clamping band 12 is further bent inwardly from the free ends 12a and 12b to form outside corners OC1 and OC2 at the ends 12a and 12b and further to form inside corners IC1 and IC2. Joining portions JP 1 and JP2 extending from the ends 12a and 12b, respectively, to the inside corners IC1 and IC2, are secured to the main body of clamping band 12, preferably by spot welding shown, for example, by the spot weld regions SW. The bent and welded ends of clamping band 12 form a pair of hollow, elongated guide opening O1 and O2 which cooperate with compression means to both align and expand the clamping band, as will be described hereinbelow, the guide openings guiding the compression means during the compression operation.

The clamping band 12 is then bent into a circular configuration as shown in FIG. 1b with the end portions of the clamping band laterally overlapping one another in a direction perpendicular to the circumferential direction, as shown in FIG. 1. The diagonally aligned (i.e., "skewed") surfaces 12h, 12i form a pair of sliding surfaces which are respectively skewed relative to their adjacent side 12d. Similarly, skewed surfaces 12e and 12h (surface 12h being obscured from view in FIG. 1) form a second pair of sliding surfaces which are skewed relative to their adjacent side 12c. These skewed surfaces are arranged so the surfaces 12e and 12h slidably engage one another and so that surfaces 12i and 12f slidably engage one another.

The threaded body 14b of a bolt 14 is inserted through the elongated openings O1 and O2, which are in alignment, as shown in FIG. 1. The bolt head 14a has a shoulder 14a–l which rests against surface 12c of band 12. The threaded body 14b extends through and beyond opening O1 and is threadedly engaged by a nut 16. A washer 18 is arranged between nut 16 and surface 12d. A similar washer 181 may be arranged between bolt head 14a and surface 12c.

The manner in which the expansion type clamping is utilized is as follows:

In applications wherein it is desired to form a liquid-tight seal between a gasket and a cored opening in a cast member such as, for example, a septic tank, catch basin or a manhole base assembly, or the like, an opening is formed in a sidewall of the cast member through suitable coring equipment (not shown), employed in situ, which is conventional and is well known and is widely used in the sewage system and septic tank field. Although coring equipment may be designed to form a opening in a cast member of relatively precise diameter and size, continued use of the coring equipment causes wearing which directly affects the size of the opening formed in cast member. Also in the case where the cast holes having a 2 degree taper are provided in the cast member, although the holes are precise, placement of the gasket in the hole can create the need for an adjustable expansion band. It is thus important to provide an expansion type clamping band which, in addition to being rugged and reliable and easy to use, has a capability of being easily adjustable to accommodate deviations in size (i.e., diameter) from an opening of an otherwise desired size.

Once the opening has been formed by the coring equipment, a portion of the gasket being installed is placed so that its internal clamping end is arranged within the cored opening. For example, the cast member and gasket may be of the type referred to as the cast member shown in FIG. 1 and receiving a connector boot 204 shown in FIG. 2 of U.S. Pat. No. 5,431,549, which description is incorporated herein by reference thereto. The internal clamping end 206 of the boot is joined to a pipe connecting end 208 by an intermediate tapered portion 210.

The expansion type clamping band 10 of the present invention is placed within the interior region of the connector boot internal clamping end and against the inner periphery of the gasket so that its end portions overlap and occupy the relative positions shown in FIG. 1c. In this position, it can be seen that the distance D measured across the overlapping portions of the band 12 are almost double the width of the clamping band 12.

The nut 16 is tightened, forcing the two ends of the clamping band to move toward a central longitudinal axis CLA. This tightening causes the engaging sliding surfaces 12e–12h. 12c–12f slide along one another, thereby moving the ends of the clamping band towards alignment with the central longitudinal axis CLA. As nut 16 is tightened, the sliding engagement of the skewed surfaces force the free ends of the band together as additional force is applied. In addition to forcing the two ends of the band together, the diameter and hence circumference of the expansion type clamping band 10 is continually increased, causing the clamping band to exert outward radial forces against the internal clamping end of the gasket, forcing the gasket in an outward radial direction and compressing the gasket between the clamping band and the interior periphery of the cored opening in the cast member to thereby create a watertight seal.

In order to be assured that the clamping band has been expanded sufficiently to obtain the desired watertight seal, a torquing device, such as a torque wrench with a visible readout of torque, which is conventional and well known in the industry, may be utilized. The torquing wrench is placed on nut 16 and is tightened. The torque reading of the torquing device is observed and tightening of the nut is completed when the desired torque reading is reached. The torque reading is obtained through the compilation of empirical data and the proper torque, typically within a given range, is normally provided with instructions for installation of the expansion band. In the present invention, the expansion band is capable of the accommodating torquing in the range of from 30 to 35 foot-pounds It should be noted that bolt 14 and nut 16 (as well as washers 18 and 18') are free to move along the elongated guide openings O1 and O2, providing an automatic, self-centering capability which further enables free sliding movement of the engaging skewed surfaces, which increases overall expansion.

One method of expanding the clamping band assembly is to place a wrench or other similar tool upon the head 14a of threaded bolt 14 to prevent the bolt from rotating while a torquing wrench is applied to nut 16 to tighten the nut as shown in FIG. 1d.

In view of the fact that the installer is confronted with a rather confined region in which to tighten nut 16 using two wrenches between the threaded portion and the (i.e., one wrench to hold the bolt head 14a still while the other wrench, usually a torque wrench, is used to rotate nut 16) an alternative embodiment of the present invention utilizes a carriage bolt 14' having a portion between the bolt head 14a and the threaded portion provided with at least two flat parallel surfaces 14c, 14d, as shown in FIG. 1e, the surfaces 14c, 14d being immediately adjacent respective opposite interior surfaces of elongated guide opening $O_2$ so as to make sliding engagement therewith, enabling the threaded bolt 14' to move along guide opening O2, as well as guide opening O1, while at the same time preventing bolt 14' from rotating as nut 16 is tightened (i.e. rotated), thereby eliminating the need for a wrench or other tool to prevent rotation of the threaded bolt 14 while nut 16 is being tightened with a torque wrench. FIG. 1g shows a plan view of the carriage bolt arrangement of FIG. 1e.

As the nut 16 is tightened, the skewed surfaces slide along one another causing the clamping band to expand radially outwardly, pressing the clamping band against the gasket. When the appropriate torquing amount is reached, by obtaining a reading on the torquing wrench and comparing this with the required torquing amount, the installer is assured that the expansion band has now been expanded to an appropriate circumferential size and presses into the gasket causing the gasket to experience compression between the periphery of the opening in the cast member and the clamping band. The compression of the gasket sets up a counter force which is exerted upon the entire outer peripheral surface of the clamping band, including the skewed ends. The gasket thus serves a function similar to a lock washer in that the forces exerted upon the clamping band, and especially the skewed end members, prevent these members from moving and thereby prevent the cooperating nut 16 and bolt 14 from experiencing any change in position and thus from experiencing any loosening. The forces exerted by the compressed gasket upon the expansion band serves to prevent any loosening of the nut and bolt and hence any loosening or reduction in circumference of the clamping band, even in the presence of any vibration which may occur during handling or transportation of the cast member as well as installation thereof and further as well as any vibration in which may occur when the cast member is fully installed in the ground or any other location. Thus, the gasket serves the dual function of providing a liquid tight seal between the pipe ultimately inserted into the gasket and the cast member as well as serving as a means for maintaining the clamping band in the desired expanded condition and further from preventing either the clamping band or the cooperating nut and bolt from loosening due to vibration or other external occurrences.

FIG. 1*f* shows another embodiment of the present invention utilizing a fixed nut 16' in addition to bolt 14 and threaded nut 16. The fixed nut 16' allows the operator to hold the fixed nut in place with a wrench while tightening the nut 16 with a torquing wrench (not shown for purposes of simplicity). Thus, the operator does not have to reach to the opposite side of the band to hold bolt head 14*a* in place while tightening nut 16.

FIGS. 1*i*, 1*j* and 1*k* respectively show perspective, plan and perspective views of still another embodiment of the present invention which employs a unique locking tab LT, which is provided with an elongated smoothly curved convex surface LTa and a square shaped opening LTb. The expansion type clamping band shown in FIGS. 1*i* through 1*k* is otherwise substantially identical to that shown in FIG. 1. The expansion type clamping band is assembled by inserting the threaded portion 14*b* of bolt through LTb so that its square shaped portion 14*c* is fitted within opening LTb. The bolt is passed through the guideways O1 and O2 of the band whereupon the washer 18 and threaded nut 16 are mounted in the manner shown in both FIGS. 1*j* and 1*k*. Nut 16 is tightened by rotating nut 16 in the clockwise direction as shown by arrow A in FIG. 1*k*. In the event that the bolt 14 experiences any clockwise rotation as the nut 16 is tightened, the smooth, concave curved surface LTa engages the interior periphery of the gasket being expanded by expansion type clamping band, preventing further rotation. The smooth concave surface LTa significantly reduces frictional drag imparted to the locking tab LT by the gasket as the locking tab experiences any rotation during tightening of nut 16, and also prevents the gasket from being damaged by the locking tab. The locking tab is also free to move in a circumferential direction together with the bolt 14, nut 16 and washer 18, the unique configuration of the locking tab LT permitting the locking tab to move together with bolt 14 nut 16 and washer 18 so as not to deter or interfere with the self-positioning feature.

In the event that it becomes necessary to loosen or remove the clamping band assembly from its expanded condition, nut 16 is rotated in the counterclockwise direction. In the event that bolt 14 turns together with the locking nut, the locking key will rotate counter-clockwise whereupon the surface portion LTc adjacent the free end of the locking tab will engage the gasket, preventing further rotation of the bolt and thereby enabling the bolt to be loosened.

Still another alternative embodiment for the compression means adapted to eliminate the need for two tightening tools is shown in FIG. 1*m* wherein the threaded member 14 and locking tab LT shown, example, in FIG. 1*i*, are replaced by a single threaded member M having the threaded body portion Ma and, in place of the bolt head 14*a* shown, for example, in FIG. 1*i*, is provided with an integral arm Mb forming a right angle with the main body portion MA and having a slight smooth curvature so as to provide a smooth, concave curved surface Mb-1 or engagement with inner periphery of the gasket against which the clamping band is expanded.

In use, the threaded body portion Ma is extended through washer $18^1$ to place the washer adjacent the "knee," i.e., at the point where arm Mb extends laterally away from the main body portion Ma. The threaded body portion Ma is extended through the openings O2 and O1, shown, for example, in FIG. 1*k*. The threaded portion is further extended through washer $18^1$ and threadedly engages nut 16. In a manner similar to the operation of locking tab LT, arm Mb extends substantially at a right angle in a manner similar to the locking Tab LT shown in FIG. 1*j*. Nut 16 is tightened by rotation in a clockwise direction as shown by arrow A in FIG. 1*k*.

In the event that threaded member M rotates with the tightening of nut 16, the curved convex surface Mb-1 engages an inner periphery of the gasket, limiting further rotation of the threaded member M, thereby eliminating the need for a wrench to hold the rim of upper M against rotation during tightening of nut 16. The smooth curved surface prevents the locking tab from cutting or damaging the gasket.

In the event that the clamping band requires loosening and/or removal, nut 16 is rotated in the counterclockwise direction. In the event that the threaded member M rotates together with the counterclockwise rotation of nut 16, the arm Mb will rotate through approximately 180 degrees whereby its free end Mb-2 will engage the gasket preventing any further rotation thereby enabling loosening and removal of the nut 16 without the need for an additional tool, such as a wrench, holding the threaded member M against rotation of nut 16 is loosened with a second wrench.

It should be understood that the compression assembly shown in FIG. 1*m* is usable with any of the clamping band assemblies the present invention shown, for example, in FIGS. 2 and 3 as well as the embodiment of FIG. 1.

In a manner similar to the locking tab embodiment shown in FIG. 1*l*, the threaded member M may be provided with a second arm $Mb^1$ extending substantially diametrically opposite arm Mb, shown in dotted fashion in FIG. 1*m*. The benefit of a second aim is to avoid the necessity for requiring that the threaded member M rotate through approximately one half turn when nut 16 is rotated in the counterclockwise direction and threaded member M is caused to rotate with rotation of nut 16. In addition, the use of a pair of arms Mb and $Mb^1$ permits use of the threaded member M with reverse threaded body members and nuts as well as the threading direction shown in FIG. 1*m*.

It should further be noted that the locking tabs LT, $LT^1$ as well as the threaded member M may be used with other expansion type clamping bands in order to eliminate two tools when tightening the nut 16. For example, the novel locking tab LT or $LT^1$ or the novel threaded member M may be used, for example, with any of the expansion type clamping bands taught in U.S. Pat. No. 5,431,459 whereby the threaded bolt 46 shown, for example, in FIG. 6 and nut 90 may be replaced by the standard carriage bolt and nut of the present invention, in combination with the locking tab LT, or bolt 46 and nut 90 may be replaced by the threaded member M and a standard threaded nut. Nut 18 of the present invention may be placed against the left hand edge of member 41 shown in FIG. 6 of the '459 patent. The locking tab is superior to the nut 90 shown in FIG. 6 of the '459 patent since these tabs are, of necessity, quite short and lack the significant leverage obtainable through the use of the locking tab LT or $LT^1$ of the present invention, thus providing a compression assembly of greatly simplified design using standard nuts and bolts. The threaded member M of the present invention may also be utilized in the embodiment shown in FIG. 6 of the '459 patent, likewise eliminating the need for a special design nut 90 and a special designed driving wedge 41 adapted to accommodate the nut 90 and its tabs 91 and 92.

Locking tab LT or threaded member M may also be used in the embodiment shown in FIGS. 13 and 14 of the '459 patent, thereby eliminating the need for the specially designed threaded member 344.

It should be understood that the square-shaped portion 14c of the threaded member 14 may be any other non-rounded configuration such as round with at least one and preferably two flattened surfaces or any other polygonal shape such as hexagonal, octagonal, etc. The opening LTb will be of a conforming shape to assure locking and hence rotation of the tab with the threaded member so that they rotate as one.

In the embodiment shown in FIGS. 1*i* through 1*k* the locking tab has the opening LTb at one end thereof. As shown in FIG. 11, the locking tab $LT^1$ has an opening $LTb^1$ intermediate the ends $LTc^1$ and $LTd^1$ and have a smoothly curved convex surface $LTa^1$ extending between the free ends $LTc^1$ and $LTd^1$. This embodiment may be used with threaded members having a reverse threading direction and further reduces the amount of rotation experienced by the locking tab and hence the threaded member during loosening. More particularly, let it be assumed that the threaded nut 16 shown in FIG. 1*k* is to be rotated in the clockwise direction as shown by arrow A in order to tighten the nut. This causes the portion of surface $LTa^1$ extending between opening $LTd^1$ and $LTc^1$ to engage an interior periphery of the gasket as the nut is rotated to thereby limit rotation of the threaded bolt during tightening of nut 16. In the event that the expansion band requires loosening, and if the threaded bolt 14 rotates with the rotation of the nut 16 in the counter-clockwise direction, the portion of the smoothly curved convex surface $LTa^1$ extending between opening $LTb^1$ and $LTd^1$ will engage the surface of the gasket to prevent further rotation of the locking tab and hence the threaded member in the counter-clockwise direction after experiencing only a small amount of rotation whereas in the embodiment shown in FIG. 1*i*, the locking tab may be obliged to rotate through 180 degrees before the locking tab and hence the threaded bolt is prevented from further rotation. In addition, the "symmetrical" design of the locking tab prevents the locking tab from being improperly installed. More specifically, the curved convex contour is oriented so that it is substantially aligned with the curvature of the clamping band. If the locking tab LT shown in FIG. 1*i* or $LT^1$ shown in FIG. 11 were to be rotated 180 degrees from the position shown in FIGS. 1*i* and 1*l*, the locking tab would be prevented from insertion against the gasket. Nevertheless, the locking tab LT shown in FIG. 1*i*, although mounted so that the smoothly curved convex surface LTa follows the contour of the clamping band, the locking tab could be inserted so that the free end LTc extends to the left relative to the threaded bolt 14a whereby the locking tab would be obliged to rotate through 180 degrees before engaging the gasket and further causing the curved convex contour surface engaging the gasket. The embodiment of FIG. 11 is thus easier to install than the embodiment shown in FIG. 1*i*.

It can thus be seen that the unique locking tab enables installation and compression of the expansion band clamping assembly requiring only one tightening tool, typically a torquing tool, such as a torquing wrench (not shown) applied to nut 16, without damaging the gasket being expanded by the clamping band assembly and further enabling the nut 16 washer 18 and bolt 14 to move along the guideways openings O1 and O2 to thereby perform the self-centering operation thereof without any interference from the locking tab. Although the locking tab is shown as being utilized with the embodiment of the invention shown, for example, in FIG. 1, it should be understood that the locking tab may be used with any of the other clamping band assemblies shown, for example, in FIGS. 2 and 3.

FIG. 1*h* is similar to the arrangement of FIG. 1*g*. However, the carriage bolt 14" herein is provided with an integral holding tab T that overlies a marginal portion of the surface of band 12 adjacent to edge 12c. The tab T slidingly engages the band, enabling slidable movement of the bolt 14" in a manner similar to the embodiments described above.

As an alternative to the embodiment 10 described hereinabove and shown in FIG. 1, the clamping band assembly may have the skewed end pieces formed of a suitable plastic material. The clamping band assembly 22 shown in FIG. 2 is fabricated as a three-piece assembly, namely a band portion 24 (shown "flattened" and in plan view in FIG. 2*a*) formed to have an annular shape, having ends 24a and 24b of reduced width, and first and second end skewed members 26 and 28 which form the end portions of the clamping band and are provided with the skewed surfaces 26a, 28a and guide slots 26b, 28b, similar to those provided in the embodiment 10 shown in FIG. 1.

More particularly, band portion 24 is formed of a suitable metallic material, such as, for example, stainless steel, whereas the end portions 26, 28 are formed of a suitable plastic material, such as a glass-filled thermal plastic. However, any other plastic material having similar properties may be used. If desired, the band may also be formed of plastic.

The end portions 26 and 28 are unitary, one-piece members each having a slot 26c, into which the reduced-width ends 24a, 24b are respectively inserted. End portions 26 and 28 are mounted upon respective ends 24a, 24b of band 24 so that the skewed surfaces 26a, 26b effectively slidably engage the skewed surfaces 28a, 28b. If desired the band 24 may be formed of a suitable plastic such as that described above.

A threaded bolt similar, if not identical, to the threaded bolt shown in the embodiment 10 is inserted through the co-aligned guide slots 26b and 28b and the nut is threaded on the free end of the threaded body 14a of the bolt in the same manner as shown in FIG. 1.

Clamping band 22 functions in substantially the same manner as the band 12 shown in FIG. 1, the difference being that band 12 is a one-piece member whereas the band assembly 22 is a three-piece member. The band assembly 22, however, is easier to mold, fabricate and assemble than the embodiment 12. Incidentally, it should be noted that there is no necessity to secure the ends 24a, 24b within the slots 26c, 28c of members 26 and 28 since expansion of the band against a gasket assures that the three-piece clamping band assembly will be maintained assembled in its proper operating position when expanded to a diameter and hence circumference of a size necessary urge a gasket against the opening in a cast member to form a watertight seal between the gasket and the cored opening in which the gasket is mounted.

The plastic band of FIG. 2 may be molded as a unitary, one-piece member as shown in FIG. 3. The embodiment 22' comprises a band portion 24' having ends 26', 28' integrally joined to the adjacent ends of band 24'. Ends 26', 28' have skewed surfaces 26a', 28a' and curved guide slots 26b', 28b' similar to those shown in FIG. 2. The skewed surfaces 26a'–26a' engage skewed surfaces 28a'–28b' and function in a manner similar to the embodiment of FIG. 2 when a nut and bolt similar to those shown in FIG. 1, for example, are arranged within the guide slots 26b', 28b' and are tightened, causing the clamping band to expand as the laterally overlapping ends 26', 28' are moved toward alignment with a longitudinal central axis of the band 22'.

The clamping bands 22 and 22' may be used with any of the nut and bolt arrangements shown in FIGS. 1 through 1g. If desired the clamping band 22 may have one end 26, for example, integrally joined to the band 24 while the other end 28, for example, is provided with an opening 28c which slidably receives an end, such as end 24a of the band 24 shown in FIG. 2.

FIGS. 4a and 4b are front and side views of an annular gasket 30 which may be employed with the expansion bands of the present invention. Gasket 30 has an outer annular portion 30a having a saw-toothed configuration on the outer periphery thereof adapted to firmly engage an interior periphery of an opening in a cast member when pressed against the opening in the cast member by an expansion band. Portion 30a is integrally joined to a truncated, conical-shaped portion 30b which terminates in an integral annular, beaded end 30c designed to encircle a pipe extending through the gasket, as is conventional. Beaded end 30c may form a water-tight seal with a pipe inserted therethrough. Alternatively a clamping band may be placed about the conical-shaped portion adjacent beaded end 30c to be assured of obtaining a liquid tight seal.

The inner periphery of portion 30a is extruded, formed or otherwise molded to provide an annular internal recess 30d to position and support the expansion band of the present invention, such as band 22 shown in FIG. 2. The annular flange 30e projecting radially inwardly from one side of recess 30d has a cut-away portion 30f which enables one end of the clamping band 12 (or 22 or 22') to extend beyond the recess 30d when the clamping band is first inserted into the interior portion of gasket 30 and before the band is tightened.

As the band is tightened, the ends of the band move closer to an imaginary center line of the band, reducing the width of the band at the region where the ends of the band laterally overlap. When the band is expanded to the desired size adequate to assure a liquid-tight seal between the gasket 30 and the opening in the cast member into which time the gasket is mounted, both ends of the band are substantially aligned with the longitudinal central axis so that both ends rest on the recess 30d.

In applications where the gasket to cast member seal is not highly critical, the clamping band may be provided with indicia such as guide lines, stamped or otherwise formed in the ends of the clamping band assembly to provide a visual indication to the installer that the clamping band has been expanded sufficiently to create satisfactory intimate contact between the cored opening and the internal clamping end of the gasket (i.e., connector boot). Noting, for example, FIG. 1d, visually observable markers M1 and M2 along skewed edge 12h and a single visually observable marker M3 is provided along skewed edge 12e. When the marker M3 is at least aligned with marker M1, this is indicative of minimum satisfactory compression of the connector boot internal clamping end between the clamping band assembly and the cored opening. So long as the marker M3 is aligned between markers M1 and M2, a minimum satisfactory clamping affect is achieved. Marker M2 may represent an extreme end of the range beyond which further expansion is to be avoided. The markers M1 and M2 may be established through empirical data obtained through appropriate testing. If desired, the markers M1 and M2 may be provided with numerical indicia representing torquing values. In addition, further graduated markings may be arranged between the markers M1 and M2, which graduated markers may likewise be provided with torque values, which markers may either be used independently of a torquing wrench or compared with the torquing wrench readings to confirm adequate tightening. The indicia may be used to establish a minimum expansion of that band, without initial concern for the amount of torque applied whereupon a torque wrench may then be used to assure that the desired liquid-tight seal has been obtained.

FIG. 5 is a perspective view showing another alternative embodiment of the present invention sharing the skewed design in common with the prior embodiments. The embodiment 40 of FIG. 5 comprises a clamping band 42, only a portion of which is shown for purposes of simplicity, which band is formed into an annular shape having ends 42a, 42b which laterally overlap one another such that skewed surfaces 42c, 42d, respectively arranged at ends 42a, 42b, slideably engage one another. The band may be formed of any suitable materials such as the metallic or plastic materials mentioned hereinabove in the disclosure of the embodiments of FIGS. 1 through 3. The skewed surfaces are preferably smooth to facilitate relative sliding there between.

A worm-type clamping assembly 44 which is of a conventional design, is comprised of a clamp portion 44a and a worm-type threaded member 44b rotatively mounted within bracket 44c, which has one end 44a-1 of band 44a secured thereto while the other end 44a-2 is free to move respectively into or out of bracket, 44c as shown by double-headed arrow E, responsive to the direction of rotation of threaded member 44b.

The installation and application of the embodiment 40 is substantially the same as those previously described in that the free ends 42a, 42b are caused to overlap one another in the lateral direction by an amount sufficient to reduce the circumference of the clamping band in order to position it within a band receiving recess provided in the gasket. Once positioned, threaded member 44b is rotated in the direction which causes the clamping band 44a to be tightened thereby causing the skewed surfaces 42c, 42d to slide along one another as their combined lateral width is reduced due to the tightening of the worm gear type clamp. A torquing wrench or other like tightening tool may be utilized. When the torque reading reaches an appropriate magnitude, this assures that the desired liquid-tight seal is provided.

In the embodiment of FIG. 5, by placing the threaded member 44b above the skewed surfaces, there is no need to provide a groove area to accommodate the nut and bolt as shown, for example, by the groove area 3f in FIG. 4a.

The embodiment 40 of FIG. 5 may be loosened simply by rotation of threaded member 44b in the direction causing the band to be loosened whereupon the force exerted upon the band by the gasket urges the band 42 to be reduced in diameter, enabling the assembly 40 to be removed, if necessary.

The embodiment 40 retains the advantages of the prior embodiments in that the gasket which is compressed between an opening in a cast member and the free ends of the clamping band bearing the skewed surfaces serves as a means for preventing the band from becoming loose due to vibration. In addition, band 44*a* of the clamping assembly 44 is capable of being self-aligned as it is tightened.

FIGS. 6*a* and 6*b* show still another embodiment 50 of the present invention which employs a band 52 similar in design to the band 42 shown in FIG. 5, and having slidably engaging skewed surfaces 52*c*, 52*d*. The assembly 54 for expanding band 52 is comprised of a substantially hollow, rectangular-shaped collar 54*a* having a threaded opening 54*b* receiving a threaded bolt 56. A substantially flat push plate. 58 is positioned between the free end of threaded member 56 and adjacent edge 52*e* of the band 52.

The embodiment 50 is assembled by first inserting one end, such as end 52*b*, of band 52 into collar 54. The other end is then placed inside the opening in collar 54 so that the ends 52*a*, 52*b* are positioned in the manner shown in FIG. 6*b*. The assembly 50 is then placed within the annular recess provided in the gasket for receiving and positioning band 52 in the same manner as the embodiments described hereinabove. The threaded bolt 56 is then rotated to drive pushplate 58 in the direction shown by arrows F, causing the skewed surfaces 52*c*, 52*d* to slide along one another thereby expanding the band 52. A suitable torquing tool may be applied to the bolt 56 for purposes of assuring that the appropriate torque is obtained. The torque value can be obtained by compilation of data relating to torque values to desired pressure levels applied to the seal between the gasket and the expansion-type clamping band by a liquid under expected operating conditions.

The positioning of the bolt 56 above the skewed surfaces 52*c*, 52*d* has the advantages of the embodiment of FIG. 5, namely eliminating the need for providing a groove area within the gasket at the location where the nut and bolt would otherwise be located as shown, for example, in the prior embodiments of FIGS. 1, 2 and 3.

The expansion type clamping band assembly, when appropriately "torqued," places the gasket under compression suitable to exert a force counteracting the expansion force of the band which serves to prevent the clamping band assembly from coming loose as a result of vibration which may be encountered during its use.

What is claimed is:

1. An expansion clamping assembly, comprising:

an annular shaped band having first and second ends;

said first and second ends each being bent over inward portions of the band and joined at given locations therealong respectively forming first and second elongated guide openings;

said first and second bent over ends each having guide surfaces on respective sides thereof which are skewed relative to side surfaces of said band adjacent said skewed surfaces;

said band being arranged so that the end portions thereof containing said guide openings overlap one another in a lateral direction to arrange the first and second skewed surfaces to be in slidable engagement with one another;

an elongated threaded member extending through said guide openings having a portion thereof resting against one of said side surfaces, said threaded member extending beyond the remaining side surface; and a threaded nut threadly engaging the elongated threaded member which, when tightened causes the first and second engaging skewed surfaces to slide along one another thereby reducing a total width of the overlapping ends while expanding an outer circumference of said band.

2. The clamping assembly of claim 1 wherein the combined width of the clamping band end portions is substantially greater than the width of the clamping band intermediate said end portions and whereby said combined width gradually decreases as the compression assembly is tightened.

3. The clamping assembly of claim 1 wherein said band is formed of a metallic member.

4. The clamping of claim 3 wherein said metallic member is steel.

5. The clamping assembly of claim 1 wherein a head portion of the elongated threaded member has a portion extending at least partially into the guide opening adjacent, said head portion engaging opposite interior surfaces of the guide opening to prevent rotation of the elongated threaded member while permitting the elongated threaded members to slidably move along said guide opening.

6. The clamping assembly of claim 5 wherein the elongated threaded member is free to move in a circumferential direction along the elongated guide openings as said compression assembly is tightened.

7. The clamping assembly of claim 1 wherein the elongated threaded member is free to move along the elongated openings as said compression assembly is tightened.

8. The clamping assembly of claim 1 further including a locking tab having an opening which receives said elongated threaded member and being locked with the threaded member so as to rotate therewith, said locking tab engaging an interior surface of an annular gasket against which the band is expanded when the threaded member is caused to rotate as the nut is rotated to prevent further rotation of the threaded member once it engages the gasket.

9. The clamping assembly of claim 8 wherein said locking tab has an elongated curved convex surface engaging the surface of the gasket to enable relative movement of the locking tab relative to the gasket surface and further acting to prevent the gasket from being damaged due to said relative movement.

10. The clamping assembly of claim 8 wherein said opening in said locking tab is arranged at one end thereof and said curved convex contour extends from said one end to an opposite free end.

11. The clamping assembly of claim 8 wherein said opening in said locking tab is arranged intermediate first and second ends of said locking tab and said curved convex contour extends between said first and second ends.

12. The clamping assembly of claim 1 wherein said elongated threaded member has a non-rounded portion at an end of said threaded member adjacent to the head portion, the opening in said locking tab conforming to said non-rounded opening to cause the locking tab to move and rotate together with the threaded member.

13. The clamping assembly of claim 12 wherein said non-rounded portion has a substantially rectangular-shaped cross-section.

14. The clamping assembly of claim 1 wherein said threaded member is comprised of a threaded body having an arm integrally joined to one end of said body and extending in a direction traverse to a central axis of said threaded body; and said arm engaging an inner surface of an annular gasket being expanded by said clamping assembly to prevent rotation of said threaded member when said nut is rotated to expand the clamping assembly.

15. The clamping assembly of claim 14 wherein said integral arm is curved to provide a smooth curved convex surface engaging said gasket inner surface when said nut is rotated to expand the clamping assembly.

16. The clamping assembly of claim 14 wherein said integral arms are curved to provide a smooth curved convex surface engaging said gasket inner surface when said nut is rotated.

17. The clamping assembly of claim 1 wherein said threaded member is comprised of a threaded body having a pair of arms integrally joined to one end of said threaded body and extending outwardly in opposing directions, each arm being transverse to a central axis of said threaded body; and at least one of said arms engaging an inner surface of an annular gasket being expanded by said clamping assembly to prevent rotation of said threaded member when said nut is rotated to expand the clamping assembly.

18. An expansion type clamping assembly, comprising:
an annular band having first and second ends;
each of said ends having an elongated guide slot extending substantially in a circumferential direction;
said first and second ends overlapping one another in a lateral direction causing a side of one of said ends to engage an adjacent side of the other of said ends;
the engaging sides being diagonally aligned to form first and second skewed sliding surfaces slidably engaging one another;
an elongated threaded member extending through said guide openings; and
a threaded nut threadedly engaging said elongated threaded member whereby, when said nut is tightened, the ends of said band are compressed using said ends to slide relative to one another thereby increasing the circumference of said clamping band.

19. The clamping assembly of claim 18 wherein at least one of said ends is removably joined to the intermediate portion of said band.

20. The clamping assembly of claim 18 wherein both ends are removably joined to the intermediate portion of said band.

21. The clamping assembly of claim 18 wherein said clamping band ends are formed of a plastic material.

22. The clamping assembly of claim 21 wherein said plastic material is glass filled thermal plastic.

23. The clamping assembly of claim 18 wherein visually observable indicia are provided along surfaces of the ends of said clamping band adjacent to said skewed surfaces to provide an indication that the clamping band has been expanded by a given amount.

24. The clamping assembly of claim 18 wherein one of said surfaces has a single mark and the other surface has at least two spaced apart marks, where said suitable amount is achieved when the single mark lies between said spaced apart marks.

25. The clamping assembly of claim 24 wherein said marks are straight lines.

26. The clamping assembly of claim 18 further including a locking tab having an opening which receives said elongated threaded member and being locked with the threaded member so as to rotate therewith, said locking tab engaging an interior surface of an annular gasket against which the band is expanded when the threaded member is caused to rotate as the nut is rotated to prevent further rotation of the threaded member once it engages the gasket.

27. The clamping assembly claim 26 wherein said elongated threaded member has a non-rounded portion at an end of said threaded member adjacent the head portion, the opening in said locking tab conforming to said non-rounded opening to cause the locking tab to move and rotate together with the threaded member.

28. The clamping assembly of claim 27 wherein said non-rounded portion has a substantially rectangular shape cross-section.

29. The clamping assembly of claim 27 wherein said locking tab has an elongated curved convex surface engaging the surface of the gasket to enable relative movement of the locking tab relative to the gasket surface and further acting to prevent the gasket from being damaged due to said relative movement.

30. The clamping assembly of claim 27 wherein said opening in said locking tab is arranged at one end thereof and said curved convex contour extends from said one end to an opposite free end.

31. The clamping assembly of claim 18 wherein said threaded member is comprised of a threaded body having an arm integrally joined to one end of said body member and extending outwardly in a direction transverse to said threaded body; and said arm engaging an inner surface of an annular gasket being expanded by said clamping assembly to prevent rotation of said threaded member when said nut is rotated to expand the clamping assembly.

32. The clamping assembly of claim 31 wherein said integral arm is curved to provide a smooth curved convex surface engaging said gasket inner surface when said nut is rotated to expand the clamping assembly.

33. The clamping assembly of claim 31 wherein said threaded member is comprised of a threaded body having a pair of arms integrally joined to one end of said body and extending outwardly in opposing directions each arm being aligned transverse to said threaded body; and at least one of said arms engaging an inner surface of an annular gasket being expanded by said clamping assembly to prevent rotation of said threaded member when said nut is rotated to expand the clamping assembly.

34. The clamping assembly of claim 31 wherein said integral arms are curved to provide a smooth curved convex surface engaging said gasket inner surface when said nut is rotated.

35. In combination, a cast member, a gasket and an expansion type clamping assembly;
said cast member having an opening;
said gasket comprising an annular-shaped, resilient compressible member having a first portion extending into the opening in said cast member;
said clamping band assembly being positioned against an inner periphery of said first portion;
said clamping band assembly comprising;
an annular-shaped band having first and second ends;
said first and second ends each being bent over inward portions of the band and joined at given locations therealong respectively forming first and second elongated guide openings;
said first and second bent over ends each having guide surfaces on respective sides thereof which are skewed relative to side surfaces of said band adjacent said skewed surfaces;

said band being arranged so that the end portions thereof containing said guide openings overlap one another in a lateral direction to arrange the first and second skewed surfaces slidable to be in engagement with one another;

an elongated threaded member extending through said guide openings having a portion thereof resting against one of said side surfaces, said threaded member extending beyond the remaining side surface; and a threaded nut engaging the elongated threaded member which, when tightened causes the first and second engaging skewed surfaces to slide along one another thereby reducing a total width of the overlapping ends while expanding an outer circumference of said band against the first portion of said gasket to compress said gasket between said clamping band assembly and the opening in said cast member whereby the compressed gasket exerts a force upon the clamping band assembly including engaging surfaces of the ends of the band having the skewed surfaces to prevent the clamping band, nut and threaded member from loosening due to vibration or other similar external influences.

36. An expansion clamping assembly, comprising:

an annular shaped expansion band having first and second ends;

said first and second ends each having guide surfaces on respective sides thereof which are skewed relative to side surfaces of said band adjacent said skewed surfaces;

said band being arranged so that the end portions thereof overlap one another in a lateral direction to arrange the first and second skewed surfaces in slidable engagement with one another; and a compression assembly engaging side surfaces of opposite ends of said band and including threaded means for moving said band ends toward one another whereby said skewed surfaces slide along one another to expand said band outwardly.

37. The assembly of claim 36 wherein said compression means comprises a worm gear type clamping band.

38. The assembly of claim 36 wherein said compression assembly comprises a compression band enclosing the ends of said expansion band and a threaded member for tightening the compression band to move the ends of the expansion band toward one another.

39. The assembly of claim 36 wherein said compression means comprises a hollow collar surrounding the ends of the expansion band; and a threaded member threadedly engaging an opening in the collar and urging one of said toward the other of said ends when said threaded member is rotated in a given direction.

40. The assembly of claim 39 further comprising a pusher plate arranged between a free end of the threaded member and an adjacent side surface of said one of said ends of the expansion band.

41. The assembly of claim 39 wherein said collar has a rectangular shape.

42. The assembly of claim 41 wherein a height of the opening in the collar is less than twice a thickness of the expansion band to prevent the ends of the expansion band from moving to a portion where the ends overlap one another in a radial direction.

* * * * *

UNITED STATES PATENT AND TRADEMARK OFFICE
CERTIFICATE OF CORRECTION

PATENT NO. : 6,607,219 B2  Page 1 of 1
DATED : August 19, 2003
INVENTOR(S) : Mirales et al.

It is certified that error appears in the above-identified patent and that said Letters Patent is hereby corrected as shown below:

Column 16,
Line 20, the word -- ends -- should be inserted after the word "said" and before the word "toward."

Signed and Sealed this

Twentieth Day of January, 2004

JON W. DUDAS
*Acting Director of the United States Patent and Trademark Office*